Heinz Hahm
Peter Krause
INVENTORS.

United States Patent Office 3,487,897
Patented Jan. 6, 1970

3,487,897
WHEEL-BRAKE CYLINDER FOR AUTOMOTIVE VEHICLE BRAKE SYSTEM
Heinz Hahm, Frankfurt am Main, and Peter Krause, Gifhorn, Germany, assignors to Alfred Teves, GmbH, Frankfurt am Main, Germany, a corporation of Germany
Filed Jan. 9, 1968, Ser. No. 696,655
Claims priority, application Germany, Jan. 20, 1967, T 33,027
Int. Cl. F16d 69/02
U.S. Cl. 188—264            10 Claims

ABSTRACT OF THE DISCLOSURE

A wheel-brake cylinder for hydraulically operable wheel brakes, e.g. drum-type internal-expansion brakes for disk-type brakes, wherein the piston is composed of a refractory ceramic, preferably sintered or fired magnesium silicate or aluminum oxide, to limit heat transfer from the brakeshoe, the piston co-operating with a sealing cup at its end remote from the brakeshoe and a filler body extending into the cup between the latter and the hydraulic chamber of the cylinder.

---

Figure 1:
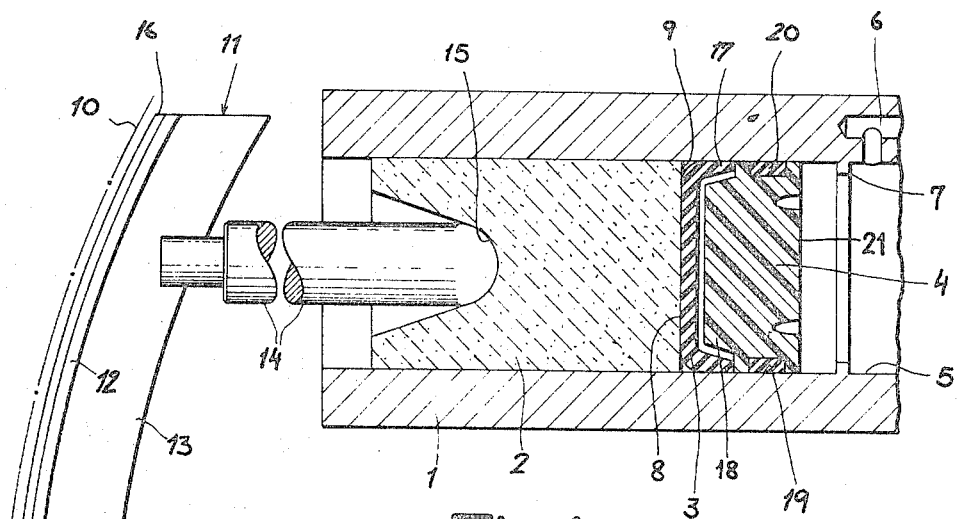

Our present invention relates to a hydraulically operable wheel-brake cylinder for an automotive wheel-brake system and, more particularly, to heat-insulating means in such a cylinder.

In internal-expansion and disk-type brakes, a hydraulically displaceable piston is axially shiftable in a wheel-brake cylinder to displace a brakeshoe against a rotating brake surface. In brakes of the former type, the brake surface is the inner face of a drum and the brakeshoe, generally extending over a cylindrical segment, is urged more or less radially against the drum. In brakes of the latter type, the rotating brake surface comprises a pair of annular braking faces formed on a disk transversely to the axis of rotation and the brakeshoe moves in a direction perpendicular to these braking faces and parallel to the axis of rotation of the disk. The frictional heat generated by the braking action is in conventional systems transferred to the thermally conductive metallic piston and adversely affects the brake fluid, thereby giving rise to fluctuating brake efficiency and response. Furthermore, corrosion of the metallic piston occurs at a relatively high rate. It has been proposed, therefore, to limit thermal conduction to the piston or to limit the thermal conductivity thereof by various means. On the other hand, the piston may be provided with a synthetic resin force-transmitting body engaging the backing plate of the brakeshoe or a force-transmitting pin. In another arrangement functioning similarly, a synthetic-resin coating is applied to the piston or the piston is made completely from a synthetic-resin material of low thermal conductivity. Such systems have, however, the disadvantage that the synthetic resins have low compressive strength, are hygroscopic and cause the penetration of moisture into the brake fluid, or are thermally sensitive and deteriorate at the elevated temperatures sustained during brake action.

It is, therefore, the principal object of the present invention to provide an improved wheel-brake arrangement for hydraulically operated automotive brakes wherein the aforementioned disadvantages are avoided.

Another object of our invention is to provide a wheel-brake system of the character described wherein the transfer of heat from the brakeshoe to other parts of the brake is limited without the danger encountered heretofore with synthetic-resin bodies.

We have found that these objects may be attained in a convenient and relatively simple manner by providing, in a wheel-brake cylinder for disk-type or internal-expansion brakes, a piston composed entirely of a ceramic material, especially magnesium silicate or aluminum oxide, sintered or fired from particles thereof into a coherent body. Thus, the piston may be produced by compressing the particle mass at relatively high pressures, e.g. from 1 to several 1000 kg./cm.$^2$, and thereafter firing or sintering the coherent body to a rigid structure. Final finishing is effected by grinding and polishing, using, for example, a diamond or silicon-carbide wheel.

Because the formation of an annular recess in the ceramic piston is difficult and does not provide, upon insertion of the usual annular seal, a satisfactory barrier to passage of fluids through the relatively porous piston, we have found that best results are obtained in sealing the pistons with the aid of a cup of elastomeric material which abuts the rear face of the piston and has its concave side turned toward the hydraulic working chamber of the cylinder. Instead of anchoring this cup to the piston, we provide a filler body, axially shiftable with the piston and composed of a synthetic resin between this cup and the hydraulic working chamber, the filler body having a convex protuberance complementary to and fitting within the concavity of the cup which is thus sandwiched between the axially shiftable filler body and the axially shiftable piston. A conventional annular seal may be provided in this synthetic-resin body. The combination of sealing cup, synthetic-resin filler body and piston has been found to provide substantially complete isolation of the brake housing and hydraulic chamber from the thermal effects of brake operation while remaining substantially insensitive to the compressive forces arising during brake operation.

Figure 2:
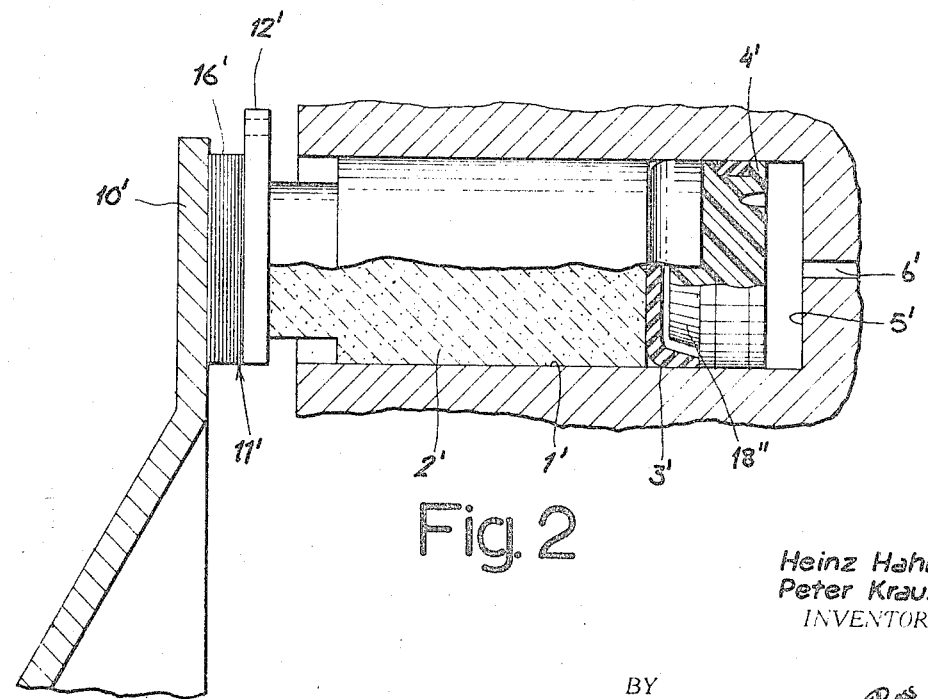

The above and other objects, features and advantages of the present invention will become more readily apparent from the following description, reference being made to the accompanying drawing, in which:

FIG. 1 is an axial cross-sectional view through a portion of a dual wheel-brake cylinder of a drum-type internal-expansion brake; and FIG. 2 is a similar view of a wheel-brake cylinder for a disk-type brake.

In FIG. 1 we show a wheel-brake of the internal-expansion type, in which the rotating brake surface is represented by the dot-dash line 10 and comprises the inner surface of a drum affixed to the wheel of the automotive vehicle or to the wheel shaft. Juxtaposed with the drum 10 are a pair of cylindrically segmental brake-shoes, one of which is represented at 11 and has a backing plate 12 whose web 13 is connected by a link pin 14 with a sintered porous ceramic piston 2 whose front end is formed with a socket 15 receiving the pin 14. The brake lining is represented at 16. The piston 2 is composed of magnesium silicate, aluminum oxide or mixtures thereof which have been compressed in a cylindrical mold to the shape illustrated at pressures of the order of 1 to, say, 1000 kg./cm.$^2$ and fired or sintered to rigidity by conventional powder-metallurgy techniques. The outer surfaces of the piston may be ground and polished to the desired finish by the use of silicon carbide or diamond wheels. The piston 2 is axially shiftable in a cylinder 1 whose hydraulic working chamber 5 receives brake fluid from the master cylinder of the vehicle-brake system via the port 6. An annular abutment 7, formed on the inner wall of the cylinder 1 provides a stop for the piston assembly in the righthand direction.

The piston assembly further comprises a rubber cup 3, free of discontinuities or openings, whose flat convex side 8 lies against the flat rearward end face 9 of the piston 2 and whose outwardly flared lips 17 slidably engage the wall of the cylinder bore. The concave side of the cup 3 is turned toward the hydraulic chamber 5 and receives a complementarily shaped protuberance 18 of a disk-shaped filler body 4 which is slidably received in the cylinder bore between the cup 3 and the hydraulic chamber 5. In the cylindrical portion of the filler body 4, which is composed of nylon or other synthetic resin of high compressive strength, we provide an annular groove 19 in which a rubber sealing ring 20 is received. The rear face 21 of the filler body has an annular recess 22 which increases the resilience of the outer portion of the body 4 and enables fluid pressure in chamber 5 to press the outer portions of the body 4 against the wall of the cylinder in a manner analogous to the operation of a flange-type seal. The assembly 2, 3, 4 prevents transfer of heat to the fluid and chamber body from the brakeshoe 11 and also insulates the brakeshoe from the remainder of the brake system.

In the system of FIG. 2, the rotating brake surface is constituted by a brake disk 10' which is rotatable in a plane perpendicular to its axis of rotation and is engaged by a pair of brakeshoes, one of which is shown at 11'. The planar brake lining 16' confronts an annular braking face of the disk 10' and is mounted upon a backing plate 12' which is directly engaged by a piston 2' axially shiftable in a cylinder 1' formed as part of the brake yoke. The piston 2', composed of magnesium silicate or aluminum oxide as described earlier, co-operates with a sealing cup 3' which is sandwiched between the piston 2' and the synthetic resin filler body 4' whose protuberance 18' is complementary to and substantially fills the concavity of the cup between the hydraulic chamber 5' and this cup. When brake fluid is supplied from the master cylinder via the port 6' to the chamber 5', the assembly 2', 3', 4' urges the brakeshoe 11' to the left to apply the brake while barring the transmission of heat to the other parts of the brake system.

We claim:

1. In a brake system having a brakeshoe, means forming a cylinder having a working chamber for receiving a brake fluid, and piston means shiftable in said cylinder by said fluid and acting upon said brakeshoe to displace same, the improvement wherein said piston means comprises an axially shiftable piston composed of sintered magnesium silicate or aluminum oxide in force-transmitting relationship with said brakeshoe.

2. The improvement defined in claim 1 wherein said piston is formed by compressing a ceramic mass composed of sintered magnesium silicate or aluminum oxide and sintering said mass after compression thereof.

3. The improvement defined in claim 2 wherein the sintered compressed mass is subjected to grinding prior to its insertion in said cylinder.

4. The improvement defined in claim 1 wherein said piston means further comprises a sealing cup of an elastomeric material received in said cylinder and abutting said piston while having a concave side facing said chamber.

5. The improvement defined in claim 4 wherein said cup is continuous and said piston has a flat surface abutting said cup.

6. The improvement defined in claim 4 wherein said piston means further comprises a disk-shaped body of synthetic resin material axially shiftable in said cylinder between said cup and said chamber.

7. The improvement defined in claim 6 wherein said body is provided with an axially extending protuberance received in and complementary to the concavity of said cup.

8. A brake system comprising a brakeshoe; means forming a cylinder having a working chamber for receiving a brake fluid; and piston means shiftable in said cylinder by said fluid and acting upon said brakeshoe to displace same, said piston means including an axially shiftable piston bearing against said brakeshoe and composed of a ceramic material, a sealing cup of an elastomeric material received in said cylinder and abutting said piston while having a concave side facing said chamber, said cup being continuous and said piston having a flat surface abutting said cup, a disk-shaped body of synthetic resin material axially shiftable in said cylinder between said cup and said chamber, said body being provided with an axially extending protuberance received in and complementary to the concavity of said cup.

9. The system defined in claim 8 wherein said piston is composed of sintered magnesium silicate or aluminum oxide.

10. The system defined in claim 9 wherein said body is formed with an annular seal slidably engaging the wall of said cylinder.

References Cited

UNITED STATES PATENTS

| | | | |
|---|---|---|---|
| 1,195,546 | 8/1916 | Wrightson | 92—248 |
| 1,204,889 | 11/1916 | Lilly | 92—248 |
| 2,814,540 | 11/1957 | Southerwick | 92—250 X |
| 3,103,787 | 9/1963 | Reynolds | 92—240 X |
| 3,148,596 | 9/1964 | Pagano | 92—249 X |

CARROLL B. DORITY, JR., Primary Examiner

U.S. Cl. X.R.

92—245, 248, 250